United States Patent [19]

Kern et al.

[11] Patent Number: 4,554,939

[45] Date of Patent: Nov. 26, 1985

[54] METERING APPARATUS

[75] Inventors: Hans Kern, Vachendorf; Richard Haslberger, Hufschlag, both of Fed. Rep. of Germany

[73] Assignee: Vereinigte Edelstahlwerke Aktiengesellschaft (VEW), Vienna, Austria

[21] Appl. No.: 533,934

[22] Filed: Sep. 20, 1983

[30] Foreign Application Priority Data

Oct. 1, 1982 [DE] Fed. Rep. of Germany ....... 3236488

[51] Int. Cl.4 ............................................ G05D 11/02
[52] U.S. Cl. ................................. 137/99; 137/101.21; 222/57; 222/66; 222/134
[58] Field of Search ...................... 137/99, 98, 101.21, 137/343; 222/43, 134, 145, 66, 57; 417/404; 91/391 R; 92/13.6

[56] References Cited

U.S. PATENT DOCUMENTS

| | | | |
|---|---|---|---|
| 1,740,683 | 12/1929 | Gartin | 91/391 R |
| 2,527,136 | 10/1950 | Kagi et al. | 137/101.21 |
| 2,837,105 | 6/1958 | Henke | 137/99 |
| 3,506,025 | 4/1970 | Benjey | 137/99 |
| 4,073,304 | 2/1978 | Lerner et al. | 137/101.21 |
| 4,119,113 | 10/1978 | Meginniss | 137/99 |
| 4,189,067 | 2/1980 | Nottke et al. | 222/66 |
| 4,337,786 | 7/1982 | Myers et al. | 137/101.21 |
| 4,341,237 | 7/1982 | Stauffer | 137/613 |
| 4,391,291 | 7/1983 | Hume | 137/99 |
| 4,392,508 | 7/1983 | Switall | 137/99 |

Primary Examiner—Martin P. Schwadron
Assistant Examiner—James R. Shay
Attorney, Agent, or Firm—Werner W. Kleeman

[57] ABSTRACT

A mobile metering apparatus is provided for metering into a liquid stream or flow an agent which is to be metered or dosed in a quantitative proportional relationship. The metering apparatus contains liquid meter through which passes the liquid flow and a metering pump connectable to a dosing agent reservoir on the input side thereof and to a metering location at the output side thereof. The metering pump meters the agent from the reservoir into the liquid flow as a function of signals supplied by the liquid meter. The liquid meter is installed in a short conduit portion provided with an inflow connection and an outflow connection. The short conduit portion, liquid meter and metering pump are mounted at a supporting frame enclosing the aforementioned members on all sides. The drive of the metering pump is accomplished by the pressure of the liquid flow. In this way a multifarious usable metering apparatus is realized which is independent of an external power supply and which is particularly suitable for decontamination and detoxication purposes.

16 Claims, 2 Drawing Figures

METERING APPARATUS

BACKGROUND OF THE INVENTION

The present invention relates to a new and improved metering apparatus for metering into a liquid stream or flow an agent which is to be metered in a quantitative proportional relationship.

In its more specific aspects the present invention concerns a new and improved metering apparatus for metering an agent to be metered or dosed in a quantitative proportional relationship into a liquid stream or flow which comprises a liquid meter and a metering pump connectable on its input side to a reservoir holding the agent to be metered and to a metering location on the output side of such pump. The metering pump meters the agent to be metered from the reservoir into the liquid flow as a function of signals which are supplied by the liquid meter.

Metering apparatuses of such type are always used in those instances which require a liquid flow to be provided with an additive such as, for example, in the treatment of water or for detoxication or decontamination of persons or articles which have come into contact with poisons or have become contaminated. It is particularly required in the last-mentioned case that the metering apparatus is immediately available and that it can operate independently of power connections which possibly may not be present. Furthermore, it is extremely important to precisely maintain the concentration in order to ensure for the necessary detoxication. These requirements cannot be met by conventional metering devices which are mounted on vehicles and only can be operated in conjunction with the vehicle.

SUMMARY OF THE INVENTION

Therefore, with the foregoing in mind it is a primary object of the present invention to provide a new and improved metering apparatus for metering an agent to be metered or dosed in a proportional relationship into a liquid flow or stream, wnich metering apparatus is immediately available and can operate independentiy of external connections with the exception of the connection for the liquid flow.

Another important object of the present invention is directed to the provision of a new and improved metering apparatus for metering an agent to be metered or dosed in a proportional relationship into a liquid flow, wherein it is readily recognizable whether the apparatus is operating in an orderly fashion.

Now in order to implement these and still further objects of the invention, which will become more readily apparent as the description proceeds, the apparatus of the present development is manifested by the features that, the liquid meter is installed in a short conduit portion which is provided with an inflow connection and an outflow connection, and the conduit portion, the liquid meter and the metering pump are mounted at a supporting frame which encloses the aforementioned members on all sides.

Preferably, the metering pump is designed as a metering piston pump, the stroke of which is adjustably limited by a counter piston which can be manually adjusted and displaced. The drive is preferably effected by the pressure of the liquid flow or stream, and a drive piston is alternatingly impinged from two sides with the pressure by means of controlled valves. Thus, only a small driving power is required. The power required for control means is supplied by a battery which is also mounted within the supporting frame, or by an external voltage source, like the power network or mains or a vehicle battery, it present.

According to a further development of the inventive metering apparatus there are provided indicating means to indicate the operation of the metering pump, the supply of the agent to be metered and a lack of the agent to be metered. In a preferred design, the metering pump is manually operable, so that after use of the metering apparatus the same can be flushed and drained in order to be protected from the effects of frost. Preferably, the assembly is designed to be shock-proof by mounting all the aforementioned members relative to the supporting frame in a vibration-damping fashion.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
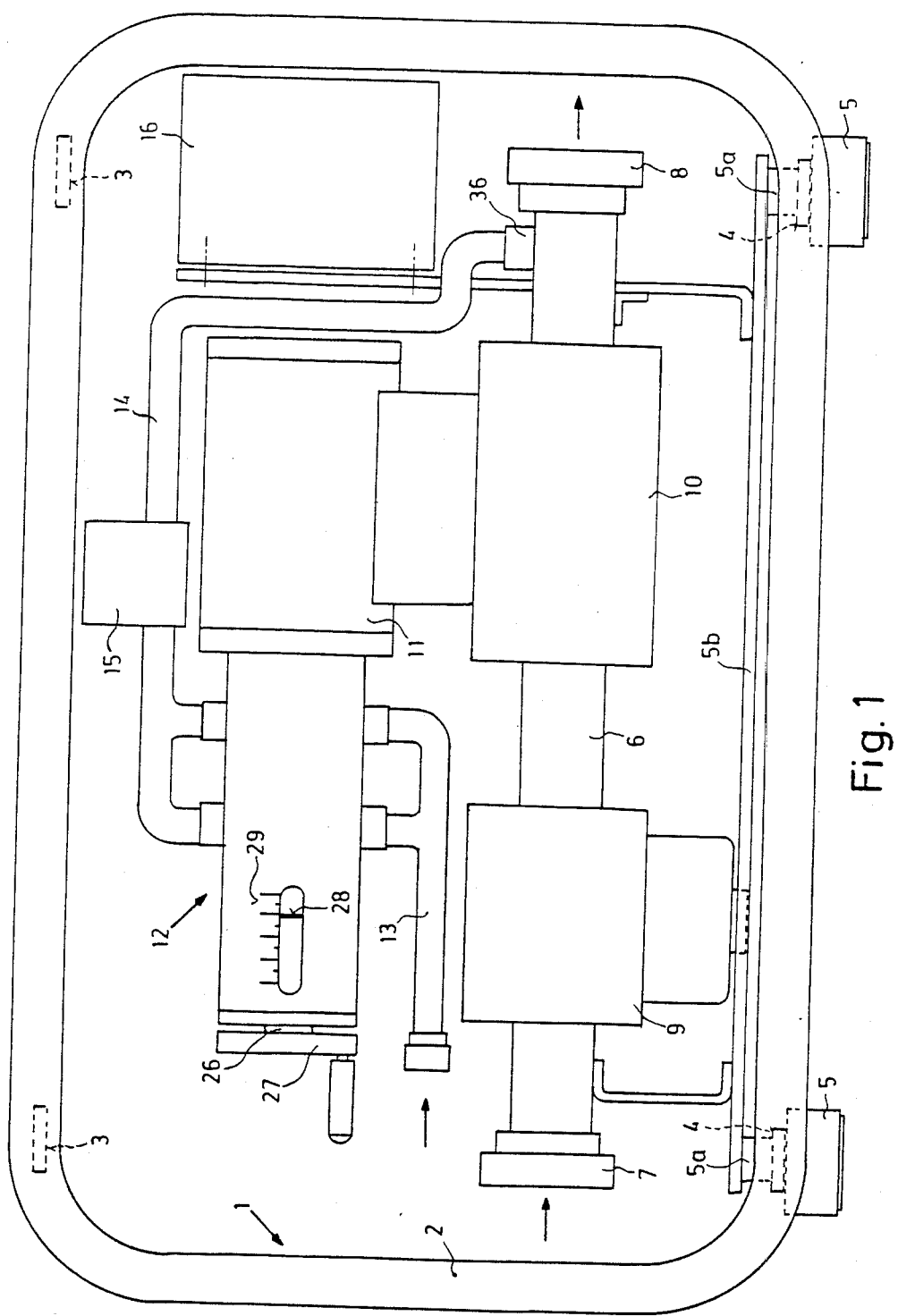
FIG. 1 is a schematic view of an exemplary embodiment of metering apparatus constructed according to the present invention.

Describing now the drawings, it is to be understood that only enough of the construction of the metering or dosing apparatus has been shown as needed for those skilled in the art to readily understand the underlying principles and concepts of the present development, while simplifying the showing of the drawings. Turning attention now specifically to FIG. 1, there have been schematically illustrated the essential components of the exemplary depicted embodiment of metering apparatus constructed according to the invention which are assembled within a supporting frame 1 or equivalent structure. The supporting frame 1 essentially comprises two lateral brackets or bracket members 2 which are bent to form a continuous rectangle with rounded corners. Two upper and lower bars or webs 3 and 4 interconnect the brackets 2. These brackets 2 are substantially vertically arranged, while the bars or webs 3 and 4 are horizontally arranged and located adjacent the rounded corners of the brackets 2. Feet 5 are provided at the lower bars or webs 4 in order to erect or to set-up the supporting frame 1. For facilitating transport the upper bars or webs 3 can be provided with handles or the like.

Within the region enclosed by the box-shaped supporting frame 1 a short conduit portron 6 including an inflow connection 7 and an outflow connection 8 is mounted on a plate or platform 5b which is connected to the supporting frame 1 via vibration-damping elements 5a. The length of the conduit portion 6 is selected such that neither the inflow connection 7 nor the outflow connection 8 protrude beyond the supporting frame 1. Both the inflow connection 7 and the outflow connection 8 are designed as conventional water hose couplings for connection to hydrants, containers on fire-fighting vehicles and the like. Furthermore, there is contained a filter 9 and a liquid meter 10 in the conduit portion 6. The liquid meter 10 is connected with drive means 11 for a metering pump 12 which delivers the agent to be metered or dosed from a reservoir, not shown in FIG. 1, through an inflow line 13 to a metering line 14 which opens into the conduit portion 6 intermediate the liquid meter 10 and the outflow connection 8. A flow monitor 15 is installed in the metering line or conduit 14. The metering pump 12 as well as control means 16 which are only schematically indicated in FIG. 1 are also arranged within the supporting frame 1 in such a way as to be surrounded or enclosed on all sides by such supporting frame 1. For shock-proof mounting of the arrangement, all the members enclosed by the supporting frame 1 are mounted at the plate or platform 5b.

Figure 2:
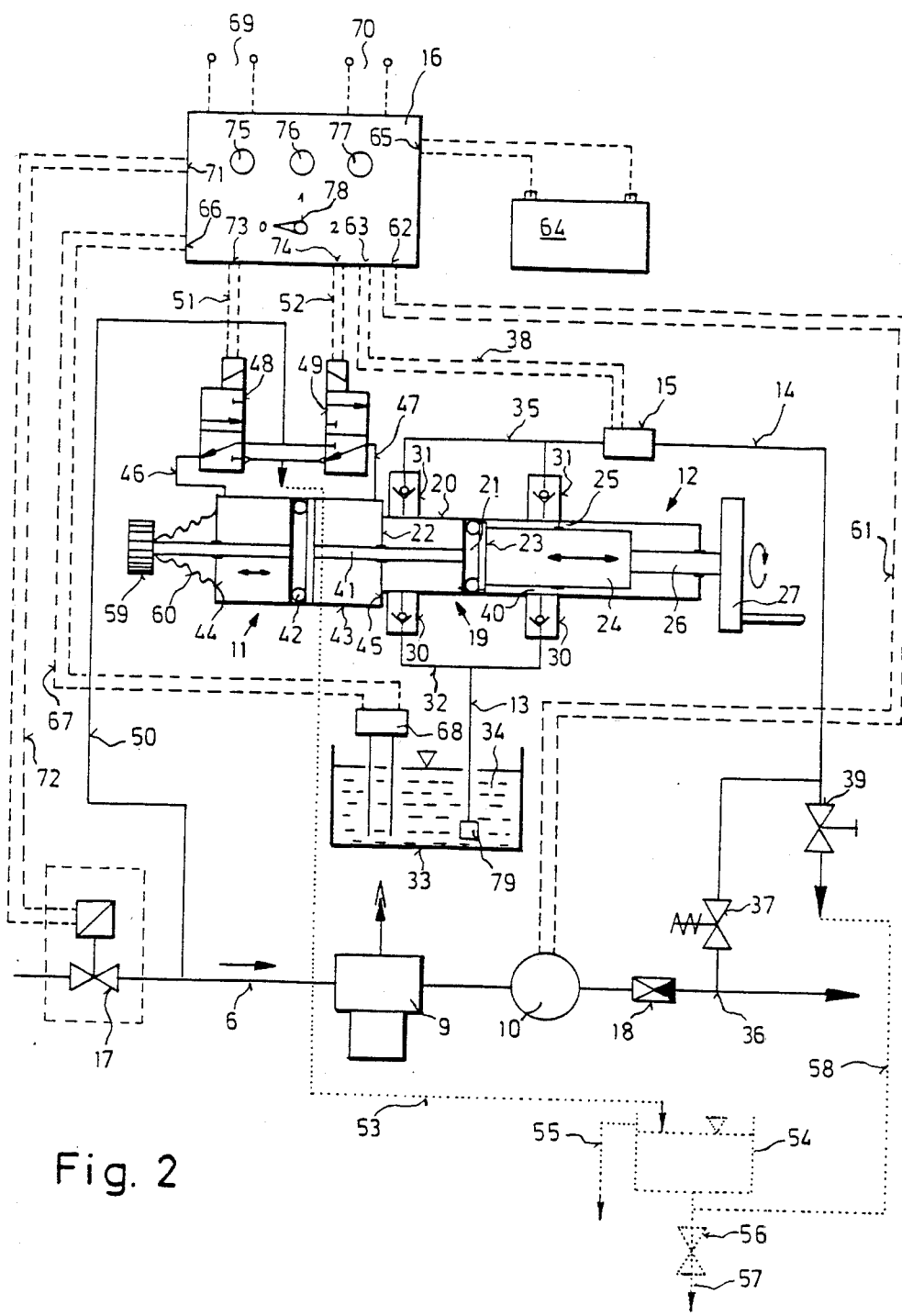
FIG. 2 is a schematic representation of the construction and of the circuitry used in the inventive metering apparatus shown in FIG. 1.

The construction and the circuitry of all of the members of the inventive metering apparatus are schematically shown in FIG. 2. In the lower portion of such FIG. 2 there is illustrated the conduit portion 6 including the filter 9 and the liquid meter 10. In the illustrated exemplary embodiment a valve 17, controllable by the control means 16, is arranged in the conduit portion 6 forwardly of the filter 9 with respect to the direction of liquid flow, while a check valve 18 is installed in the conduit portion 6 after the liquid meter 10 with respect to the direction of liquid flow.

The central portion of FIG. 2 shows the metering pump 12, the drive means or drive 11 therefor and a metering section 19 thereof. The metering section 19 comprises a metering cylinder 20 within which a metering piston 21 is displaceable. The stroke or displacement of the metering piston 21 is limited on the one side by a first end face or wall 22 of the metering cylinder 20 and on the other side by the end face or surface 23 of a counter piston 24. The counter piston 24 is coaxially arranged with respect to the metering cylinder 20 and the metering piston 21. This counter piston 24 is displaceably mounted at the second end face or wall 25 of the metering cylinder 20. On the side which is remote from the metering piston 21 the counter piston 24 is connected via a spindle 26 to a hand wheel 27 or equivalent operating member. By rotating the hand wheel 27 the counter piston 24 can be axially displaced relative to the metering cylinder 20. Instead of the depicted manual drive including the hand wheel 27 and the spindle 26, it will be self-evident that other manual or motor-driven displacements or drives of the counter piston 24 are possible. The position of the counter piston 24 is conveniently indicated by suitable indicating means, here shown as comprising a pointer 28 and a graduation or scale 29 in the manner depicted in FIG. 1; the pointer 28 is connected to the counter piston 24. Preferably the division of the graduation or scale 29 is selected such that, in a manner still to be described hereinafter the position of the counter piston 24 as indicated by the pointer 28 at the graduation or scale 29 directly indicates the proportion of the agent to be metered or dosed.

Two suction valves 30 and two pressure valves 31 are arranged at the outer circumferential surface of the metering cylinder 20, each immediately adjacent a respective one of the end faces or walls 22 or 25. The suction valves 30 are interconnected by a connecting line 32 and are connected to a supply reservoir 33 holding the agent 35 to be metered, by means of an infeed line 13 which is connected to the connecting line 32. The pressure valves 31 are interconnected by a connecting line 35 and are connected in the manner as described hereinbefore to the conduit portion 6 at a metering location or point 36 via the metering line 14 which is connected to such connecting line 35. A metering valve 37 as well as the flow monitor 15 are connected in the metering line 14. The flow monitor 15 is connected on the output side thereof to the control means 16 via a signal line 38. The metering line 14 further comprises a branch-line including a vent valve 39.

The arrangement of the suction valves 30 and the pressure valves 31 is selected such that the inflow and the outflow of the agent through the suction valve 30 and the pressure valve 31 arranged near to the end face or wall 22 is possible until the metering piston 21 engages such end face or wall 22 which limits the stroke of the metering piston 21 on the one side. The inflow and the outflow through the other suction valve 30 and pressure valve 31 arranged near the other end face or wall 25 is possible until the metering piston 21 engages the end face or surface 23 of the counter piston 24 which limits the stroke of the metering piston 21 on the other side, and this occurs independent of the position of the counter piston 24. For this purpose the counter piston 24 has a diameter which is smaller than the diameter of the metering piston 21 or, respectively, smaller than the internal diameter of the metering cylinder 20. A gap or space 40 is thus present between the metering piston 21 and the metering cylinder 20 through which the agent to be metered can flow into or from the displacement chamber or volume of the metering piston 21. The length of the counter piston 24 is selected such that the stroke of the metering piston 21 is nearly zero when the counter piston 24 assumes a position in which it is totally pushed into the metering cylinder 20. In such a case the distance between the end face or wall 22 and the end face or surface 23 of the counter piston 24 approximately corresponds to the thickness or the metering piston 21. Moreover, the counter piston 24 can be displaced out of the metering cylinder 20 to such an extent that the end face or surface 23 of the counter piston 24 is approximately positioned in one plane together with the end face or wall 25 of the metering cylinder 20. In this position a maximum stroke of the metering piston 21 is possible.

The metering piston 21 is connected to a drive piston 42 via a piston rod 41. The drive piston 42 is displaceable within a drive cylinder 43 which coaxially adjoins the metering cylinder 20 at the one end face or wall 22 thereof. The length of the drive cylinder 43 essentially corresponds to the length of the metering cylinder 20, so that the drive piston 42 engages an end face or wall 44 of the drive cylinder 43 in a first position in which the metering piston 21 engages the end face or wall 22 of the metering cylinder 20. In a second position the drive piston 42 engages the end face or wall 45 of the drive cylinder 43 which adjoins the end face or wall 22 of the metering cylinder 20, and in this second position the metering piston 21 engages the end face or surface 23 of the counter piston 24 which is in the farthest pushed-out or retracted position.

The drive cylinder 43 is connected to the conduit portion 6 by conduits 46 and 47 via solenoid valves 48 and 49 which are arranged close to the respective end faces or walls 44 and 45 of the drive cylinder 43 and via a conduit or line 50 which opens into the conduit portion 6. The inputs of the solenoid or electromagnetic valves 48 and 49 are each connected to appropriate outputs 73 and 74 of the control means 16 via control lines 51 and 52, respectively. The solenoid valves 48 and 49 are connected in such a way that alternatingly one side of the drive piston 42 can be impinged via the conduit or line 50 by the pressure of the liquid flowing in the conduit portion 6. On their drain or outflow side these solenoid valves 48 and 49 are connected to a common drain or outflow line 53 which is shown by a dotted line in FIG. 2 and which opens into a container or receptacle 54. The container 54 is equipped with an overflow 55 as well as with a drain or discharge line 57 which can be closed by a valve 56. Intermediate the container 54 and the valve 56 the drain or discharge line 57 is connected via a line 58 to the metering line 14 via the vent valve 39.

In the embodiment shown in FIG. 2 the piston rod 41 is constructed to possess an extension sucn that it passes through the end face or wall 44 of the drive cylinder 43 located opposite the end face or wall 45 adjoining the metering cylinder 20. A knob or knurled member 59 is mounted to the piston rod 41 at its free end which protrudes outside of the drive cylinder 43. The exposed protruding portion of the piston rod 41 extending between the drive cylinder 43 and the knob 59 is covered by a bellows 60. The piston rod 41 thus carries at its two ends the knob 59 and the metering piston 21, respectively. The drive piston 42 is carried by the central section or region of the piston rod 41 which extends from the outside through both of the end faces or walls 44 and 45 of the drive cylinder 43 into the metering cylinder 20.

The control means 16 comprise a first input 62 connected to the liquid meter 10 via the signal line 61, a second input 63 connected to the flow monitor 15 via the signal line 38 as well as a third input 65 connected to a battery 64 which is also arranged within the supporting frame 1. A fourth input 66 of the control means 16 is connected via a signal line 67 to the output of a low level or empty state indicator 68 arranged within the metered agent reservoir 33. The control means 16 is further provided with terminals 69 for connection to a line voltage of, for example, 220 volts and with terminals 70 for connection to a 12 volt power supply. A first output 71 is connected to the valve 17 via a control line 72, the second output 73 is connected to the solenoid valve 48 via the control line 51, and the third output 74 is connected to the solenoid valve 49 via the control line 52. Three optical indicating means or indicators 75, 76 and 77 are provided at the housing of the control means 16, namely a first indicating means 75 indicating the operation of the metering apparatus by a green light, a second indicating means 76 indicating the presence of a signal from the flow monitor 15 via the signal line 38 by a yellow light, and a third indicating means 77 indicating the presence of a signal which is present when the reservoir 33 for the agent to be metered has been emptied, which signal arrives from the low level or empty state indicator 68 via the signal line 67 and which is indicated by a red light, for instance. Finally, a main switch 78 is provided at the control means 16, wherein in the "0" position thereof the metering function is cut-off, in the "1" position thereof the solenoid valves 48 and 49 are synchronously switched, and in the "2" position of which the apparatus is in operation.

For its operation the inventive metering apparatus is brought to the place of use and is set-up there in appropriate manner. The inflow connection 7 is, for instance, connected to a hydrant, to the reservoir of a fire-fighting vehicle, to a drinking water system, or to any other available pressurized water reservoir. A sprinkling or spraying apparatus suitable for the momentary field of use, is connected to the outflow connection 8. If external voltage sources like a power mains, a vehicle battery and the like are available such may be connected to the corresponding terminals 69 or 70 of the control means 16. Wnen no connection is made with the terminals 69 or 70 the control means 16 is automatically powered by the voltage source 64 installed within the supporting frame 1. The reservoir 33 for the agent to be metered is also installed at the place of use and is connected via the infeed line 13 to the metering pump 12. For this purpose preferably a suction lance 79 or the like is provided at the end of the infeed line 13 and this suction lance 79 is introduced into the metered agent reservoir 33. Furthermore, the low level or empty state indicator 68 is inserted into the reservoir 33. In a specifically preferred embodiment such low level or empty state indicator 68 is provided at the suction lance 79, so that only this device need be introduced into the reservoir 33. Finally, the counter piston 24 is displaced by operating the hand wheel 27 to such an extent that the pointer 28 indicates the desired or required concentration of the agent to be metered at the graduation or scale 29.

The control means 16 opens the valve 17 via the signal line 72 when the primary or main switch 78 is switched into its "2" position and the liquid commences to flow through the conduit portion 6 including the filter 9, the liquid meter 10 and the check valve 18 towards the sprinkling or spraying device. Signals are supplied by the liquid meter 10 to the control means 16 via the signal line 61 and the signals are dependent upon the amount of liquid flowing or streaming through the liquid meter 10 per unit of time. The control means 16 indicates the operative state by illuminating the green light of the first indicating means 75 and switches the solenoid valves 48 and 49 via the respective control lines 51 and 52 such that the drive piston 42 is alternatingly subjected at both faces or sides thereof, to the pressure of the liquid via the line 50. As a result the drive piston 42 performs a reciprocating movement. The number of strokes of the drive piston 42 per unit of time is governed by the switching cycle of the solenoid valves 48 and 49 which is predetermined by the control means 16. This cycle is determined by the control means 16 on the basis of the signals received from the liquid meter 10.

The size of the stroke or displacement of the drive piston 42 performed after each switching-over step, and thus, the stroke of the metering piston 21 is governed by the preselected position of the counter piston 24. During each stroke or displacement the metering piston 21 sucks-up on one side thereof the agent to be metered from the reservoir 33 via the suction valve 30 and the infeed line 13 and simultaneously delivers on the other side thereof the agent to be metered, which was sucked-up during the preceding stroke, by means of the corresponding pressure valve 31 and the metering line 14 to the metering location 36 and into the liquid flow. During each stroke the metering piston 21 reciprocates between the end face or wall 22 of the metering cylinder 20 and the end face or surface 23 of the counter piston 24. Thus, the concentration of the agent to be metered in the liquid flow is adjusted, firstly, by the numbr of strokes per unit of time of the metering piston 21, and secondly, by the stroke of the metering piston 21 as limited by the counter piston 24. Wnen the number of strokes per unit of time is predetermined by the control means 16 at a fixed ratio with respect to the flow of the agent to be metered, the concentration of the agent can be unambiguously adjusted by displacing the counter piston 24. The flow monitor 15 establishes the presence of a flow of the agent to be metered, which is then indicated by the yellow light of the second indicating means 76. Lack of the agent to be metered is signalled by the low level or empty state indicator 68 to the control means 16 via the signal line 67 and causes the red light of the third indicating means 77 to light up.

The liquid quantity used for operating the drive piston 42 empties into the container 54 through the drain or outflow line 53 and is collected therein up to the level of the overflow 55. After the metering operation the inflow connection 7 and the outflow connection 8 are disconnected, the primary or main switch 78 is moved to the "1" position in which the solenoid valves 48 and 49 are synchronized, and the suction lance 79 is introduced into the container 54. The metering pump 12 is now manually flushed. This is effected in such a way that the metering piston 21 is manually reciprocated by means of the knob 59. During each stroke or displacement the metering piston 21 sucks-up liquid from the container 54 and expels the same through the metering line 14. Any residues emanating from the metered agent are thus flushed from the metering pump 12 and from the conduits or lines connected thereto. Thereafter, the metering pump 12 may be drained by directing the intake port of the suction lance 79 to the open or ambient, by opening the vent valve 39 and by operating the metering pump 12 by using the actuating knob 59 for reciprocating the same.

The metering apparatus designed according to the invention provides for a mobile metering apparatus which can be brought to its intended site of use by almost any kind of vehicle, can be readily set-up at its place of use and is independent of the energy supply present at such place of use. This is specifically achieved by extracting the energy required for the drive of the metering pump 12 from the pressure of the liquid. Thus, energy is only required for controlling the metering pump 12 and the indicating means 75, 76 and 77. Furthermore, due to the volumetric metering, there is possible a high-precision metering independent of the counter pressure, i.e. the pressure of the liquid in the conduit portion or line 6 which counteracts the metering operation. The metering pump 12 furthermore operates independently of the viscosity of the metered medium which depends upon the chemical composition thereof or upon environmental conditions. After use, the metering apparatus may be manually flushed and vented. Any undesired deposition of the agent to be metered in the metering pump 12 is thus prevented and there is also possible a storage of the equipment safe from frost effects. The inventive metering apparatus is thus especially suitable for detoxication or decontamination in the field of civil defense, in military applications, and in the fire-fighting field where agents have to be metered and added to a water flow or stream.

While there are shown and described present preferred embodiments of the invention, it is to be distinctly understood that the invention is not limited thereto, but may be otherwise variously embodied and practiced within the scope of the following claims.
ACCORDINGLY,

What we claim is:

1. A metering apparatus for metering into a liquid flow an agent which is to be metered in a proportional relationship, comprising:

a liquid meter for delivering signals representative of the throughflow of the liquid flow;
    means defining a metering location where said agent is delivered to said liquid flow;
    a reservoir holding said agent to be metered;
    a metering pump having an input side and an output side;
    said metering pump being connectable to said reservoir at said input side and to said metering location at said output side;
    said metering pump metering said agent from said reservoir into said liquid flow as a function of said signals delivered by said liquid meter;
    said means defining a metering location including a conduit portion provided with an inflow connection and an outflow connection;
    said liquid meter being operatively associated with said conduit portion;
    a supporting frame;
    said conduit portion, said liquid meter and said metering pump being mounted at said supporting frame; and
    said supporting frame enclosing essentially at all sides said conduit portion, said liquid meter and said metering pump.

2. The apparatus as defined in claim 1, further including:
    control means provided within said supporting frame and having an input side and an output side;
    said control means being connected to said liquid meter on the input side of said control means and to said metering pump on the output side of said control means; and
    said control means controlling said metering pump as a function of said signals delivered by said liquid meter.

3. The apparatus as defined in claim 2, further including:
    a voltage source provided within said supporting frame and constituting a current supply for said control means.

4. The apparatus as defined in claim 1, further including:
    indicating means for indicating the metering operation.

5. The apparatus as defined in claim 1, further including:
    indicating means for indicating the operation of said metering pump.

6. The apparatus as defined in claim 1, further including:
    first and second indicating means for indicating the metering operation and the operation of said metering pump, respectively.

7. The apparatus as defined in claim 2, further including:
    a low level indicator operatively connected to said control means; and
    indicating means for indicating a lack of said agent to be metered.

8. The apparatus as defined in claim 7, wherein:
    a shut-off valve provided for said conduit portion;
    said shut-off valve being connected to an output of said control means and responding to shut-off signals received from said control means in order to shut off said conduit portion when there is a lack of said agent to be metered.

9. The apparatus as defined in claim 1, wherein:

said metering pump comprises a metering section which includes a metering cylinder and a metering piston with an adjustable stroke and displaceably arranged in said metering cylinder.

10. The apparatus as defined in claim 9, further including:
a counter piston displaceably arranged within said metering cylinder; and
said stroke of said metering piston being adjustable by means of said counter piston.

11. The apparatus as defined in claim 10, further including:
indicating means indicating the position of said counter piston at a graduation showing the metered proportion of said agent;
said counter piston being operatively associated with said indicating means.

12. The apparatus as defined in claim 9, further including:
drive means for said metering pump; and
said drive means being operable by the pressure of said liquid flow.

13. The apparatus as defined in claim 12, wherein:
said drive means comprises a drive cylinder and a drive piston displaceable within said drive cylinder;
a piston rod for connecting said drive piston to said metering piston;
a conduit for connecting said drive cylinder to said conduit portion;
control means provided within said supporting frame and having an input side and an output side;
said control means being connected to said liquid meter on said input side of said control means and to said metering pump on said output side of said control means;
said control means controlling said metering pump as a function of said signals delivered by said liquid meter;
valve means operated by said control means; and
said drive piston being alternatingly impinged at two sides thereof by said pressure of the liquid flow passing through said conduit.

14. The apparatus as defined in claim 9, wherein: said metering pump comprises a manually operable pump structure for flushing and draining purposes.

15. A mobile metering apparatus for metering into a liquid flow an agent which is to be metered in a proportional relationship, comprising:
a liquid meter for delivering signals representative of the throughflow of the liquid flow;
means defining a metering location where said agent is delivered to said liquid flow;
a reservoir holding a supply of said agent to be metered;
a metering pump having an input side and an output side;
said metering pump being connected to said reservoir at said input side and to said metering location at said output side;
control means receiving said signals delivered by said liquid meter and controlling said metering pump as a function of said signals received from said liquid meter;
said control means controlling said metering pump such that said agent is substantially continually metered from said reservoir into said liquid flow as a function of said signals delivered by said liquid meter;
said means defining a metering location including a conduit portion provided with an inflow connection and an outflow connection;
said liquid meter being operatively associated with said conduit portion;
a supporting frame;
said conduit portion, said liquid meter and said metering pump being mounted at said supporting frame; and
said supporting frame enclosing essentially at all sides said conduit portion, said liquid meter and said metering pump.

16. The mobile metering apparatus as defined in claim 15, further including:
drive means driving said metering pump and operated by said control means; and
said metering pump continuously metering said agent into said liquid flow during such times as the drive means are operated by said control means.

* * * * *

UNITED STATES PATENT AND TRADEMARK OFFICE
CERTIFICATE OF CORRECTION

PATENT NO. : 4,554,939
DATED : November 26, 1985
INVENTOR(S) : Hans Kern et al

It is certified that error appears in the above—identified patent and that said Letters Patent is hereby corrected as shown below:

Column 1, line 41, please delete "wnich" and insert --which--

Column 1, line 42, please delete "independentiy" and insert --independently--

Column 2, line 4, please delete "it" and insert --if--

Column 2, line 57, please delete "portron" and insert --portion--

Column 6, line 66, please delete "wnen" and insert --when--

Signed and Sealed this

Eleventh Day of March 1986

[SEAL]

Attest:

DONALD J. QUIGG

Attesting Officer

Commissioner of Patents and Trademarks